J. T. JANETTE.
BEARING LUBRICATOR.
APPLICATION FILED NOV. 8, 1920.

1,390,443.

Patented Sept. 13, 1921.

Witness:
R. L. Darrington

Inventor,
John T. Janette
By Glenn S. Noble
Atty.

UNITED STATES PATENT OFFICE.

JOHN T. JANETTE, OF CHICAGO, ILLINOIS.

BEARING-LUBRICATOR.

1,390,443.   Specification of Letters Patent.   Patented Sept. 13, 1921.

Application filed November 8, 1920. Serial No. 422,609.

*To all whom it may concern:*

Be it known that I, JOHN T. JANETTE, a citizen of the United States, residing at Chicago, in the county of Cook and State of Illinois, have invented certain new and useful Improvements in Bearing-Lubricators, of which the following is a specification.

This invention relates to oilers or lubricators for bearings or the like, but is applicable for general purposes. The objects are to provide an improved lubricating device having such advantages and novel features as will appear more fully from the following specification.

In the accompanying drawings showing a form of my invention;

Figure 1:
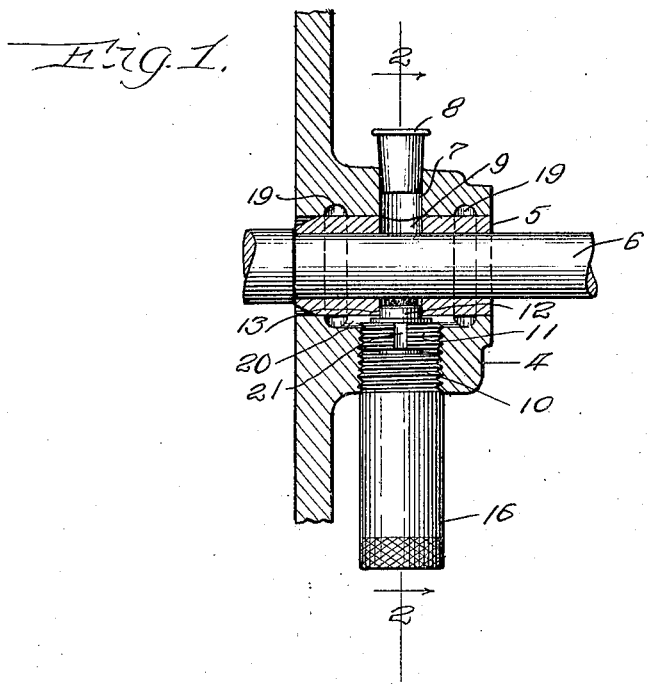
Figure 1 is a vertical sectional view of a bearing with the lubricator applied thereto.
Figure 2:
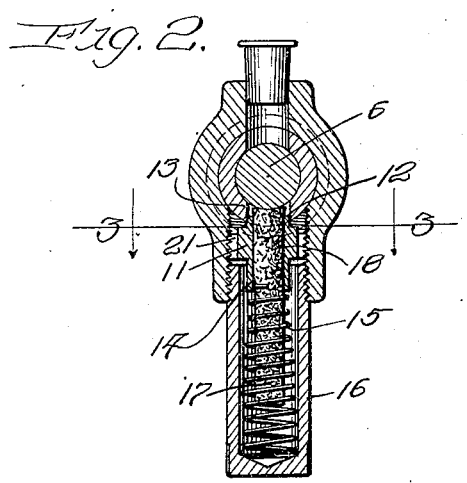
Fig. 2 is a sectional view taken on the line 2—2 of Fig. 1.
Figure 3:
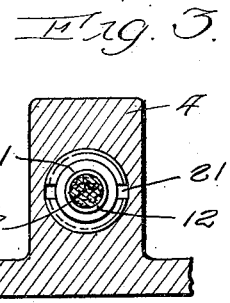
Fig. 3 is a sectional view on the line 3—3 of Fig. 2.

The main bracket or bearing 4 has a bushing 5 which is usually formed of brass or other suitable bearing metal. The shaft 6 fits in the bushing in the usual manner. The bearing 4 has an oil opening 7 which is fitted with a cap or plug 8 and the bushing has a hole 9 in alinement with the opening 7. The bearing 4 has a threaded hole 10 in the bottom thereof into which is secured a plug 11. This plug has an upwardly extending projection 12 which fits in a hole 13 in the lower side of the bushing 5. It also has a downwardly extending projection 14 for engagement with a spring 15 which fits in the oil cup 16. This spring serves as a support for a wick 17 which passes up through a hole 18 in the plug 11 and rests against the shaft 6. The oil cup 16 is threaded to engage with the threaded hole 10.

The housing 4 has internal grooves 19 which are connected by grooves 20 with the central opening 10 and the plug 11 has radial slots 21 so that excess oil may pass from the bearing down through these grooves and slots to the oil cup.

From this description it will be seen that it is only necessary to thread a single hole in the bearing in order to accommodate the plug and oil cup and this hole is arranged so that the top may run through and make the threading operation very easy. The parts can also be quickly assembled and it is not necessary to thread the bushing 5 to receive the end of the plug or wick support 11.

Having thus described my invention what I claim and desire to secure by Letters Patent is;

1. The combination of a bearing having a threaded hole in the bottom thereof, a bushing in said bearing having a hole in one side thereof, a hollow plug in said threaded hole, an oil cup opening into said hole, and a wick extending up from the cup through the plug.

2. The combination with a bearing having a threaded hole in the side thereof, of a bushing having a hole in alinement with the threaded hole, a wick guide engaging with the threaded hole having a projection fitting in the hole in said bushing, an oil cup opening into said threaded hole, and a wick extending up from the cup through the wick guide.

3. A bearing having a wick guide and an oil cup with threaded portions of the same diameter and both screwed into the same hole in the bearing.

JOHN T. JANETTE.